(12) United States Patent
Schley-May et al.

(10) Patent No.: US 7,907,659 B2
(45) Date of Patent: Mar. 15, 2011

(54) DUAL-BAND LINE INTERFACE CIRCUIT CAPABLE OF MULTI-BAND COMMUNICATION

(75) Inventors: James T. Schley-May, Nevada City, CA (US); Brian R. Wiese, San Francisco, CA (US)

(73) Assignee: 2Wire, Inc., San Jose, CA (US)

( * ) Notice: Subject to any disclaimer, the term of this patent is extended or adjusted under 35 U.S.C. 154(b) by 795 days.

(21) Appl. No.: 11/866,187

(22) Filed: Oct. 2, 2007

(65) Prior Publication Data

US 2009/0086799 A1 Apr. 2, 2009

(51) Int. Cl.
*H04B 1/38* (2006.01)

(52) U.S. Cl. ......... 375/222; 375/220; 375/296; 375/350

(58) Field of Classification Search .................. 375/222, 375/220, 396, 350
See application file for complete search history.

(56) References Cited

U.S. PATENT DOCUMENTS

| | | |
|---|---|---|
| 3,586,881 A | 6/1971 | Gaunt, Jr. |
| 3,617,645 A | 11/1971 | Gumley |
| 3,955,052 A | 5/1976 | Orbach |
| 4,103,118 A | 7/1978 | Bergman |
| 4,380,690 A | 4/1983 | Matsufuji et al. |
| 4,429,299 A | 1/1984 | Kabat et al. |
| 5,109,409 A | 4/1992 | Bomgardner et al. |
| 5,133,006 A | 7/1992 | Khuat |
| 5,426,697 A | 6/1995 | McGrane |
| 5,515,433 A | 5/1996 | Chen |
| 5,712,977 A | 1/1998 | Glad et al. |
| 5,790,656 A | 8/1998 | Rahamim et al. |
| 5,901,210 A | 5/1999 | Schley-May |
| 6,067,316 A | 5/2000 | Amrany et al. |
| 6,163,579 A | 12/2000 | Harrington et al. |
| 6,169,792 B1 | 1/2001 | Schley-May |
| 6,172,992 B1 | 1/2001 | Hoffmann |
| 6,359,972 B1 | 3/2002 | Schott et al. |
| 6,400,772 B1 | 6/2002 | Chaplik |
| 6,731,752 B1 | 5/2004 | Chaplik et al. |
| 6,792,104 B2 | 9/2004 | Schley-May |
| 6,850,618 B1 * | 2/2005 | Mohajeri et al. ......... 379/399.01 |
| 7,020,277 B1 | 3/2006 | Lee et al. |

(Continued)

OTHER PUBLICATIONS

U.S. Appl. No. 10/382,171, dated Mar. 4, 2003, Schley-May.

(Continued)

*Primary Examiner* — Shuwang Liu
*Assistant Examiner* — Kabir A Timory
(74) *Attorney, Agent, or Firm* — Blakely, Sokoloff, Taylor & Zafman LLP

(57) ABSTRACT

In an embodiment, a DSL communication device comprising a line interface circuit is disclosed. The line interface circuit includes a hybrid circuit to interface the communication device to a communication line, a lowpass transmit filter to pass signals in a first frequency band, and a highpass transmit filter to pass signals in a second frequency band, where the second frequency band is higher in frequency than the first frequency band. The outputs of the highpass and lowpass filters are coupled in parallel to the communication line. The lowpass and highpass filters as well as the low and highpass transformers are optimized for their frequency bands. Further, the edges of the low and high frequency bands are sufficiently separated to reduce interference from the other frequency band. These factors, in part, allow a multiple tone communication device to be capable of operating in multiple modes of operation with multiple DSL varieties.

16 Claims, 11 Drawing Sheets

U.S. PATENT DOCUMENTS

| | | | |
|---|---|---|---|
| 7,061,987 | B1 | 6/2006 | Tan et al. |
| 7,072,464 | B2 | 7/2006 | Hsieh |
| 7,684,499 | B2 | 3/2010 | Schley-May |
| 2003/0179858 | A1 | 9/2003 | Bella et al. |
| 2005/0034159 | A1* | 2/2005 | Ophir et al. .................. 725/78 |
| 2005/0147234 | A1 | 7/2005 | Zhou |
| 2007/0047664 | A1 | 3/2007 | Schley-May |

OTHER PUBLICATIONS

Wikipedia®, "ITU G.992.1", http://en.wikipedia.org/wiki/ITU_G.992.1, Jul. 6, 2007, 10 pages.

Wikipedia®, "Asymmetric Digital Subscriber Line", http://en.wikipedia.org/wiki/Asymmetric_Digital_Subscriber_Line, Aug. 20, 2007, 7 pages.

Wikipedia®, "ITU G.993.1", http://en.wikipedia.org/wiki/ITU_G.993.1, May 19, 2007, 1 page.

Wikipedia®, "Very High Speed Digital Subscriber Line", http://en.wikipedia.org/wiki/Very_High_Speed_Digital_Subscriber_Line, Aug. 23, 2007, 5 pages.

International Search Report and Written Opinion of the International Searching Authority, PCT/US08/11378 filed Oct. 1, 2008, mailed Dec. 5, 2008.

* cited by examiner

DUAL-BAND LINE INTERFACE CIRCUIT CAPABLE OF MULTI-BAND COMMUNICATION

FIELD

Embodiments of the invention generally relate to a communication device. Specifically, an aspect of an embodiment of the invention relates to a line interface circuit that includes a hybrid circuit and transmit filtering.

BACKGROUND

Very high-bit-rate digital subscriber line (VDSL) modems may transmit in multiple frequency bands. However, due to the wide frequency range utilized by VDSL many problems can arise. VDSL generally adheres to an International Telecommunication Union (ITU) G.993 standard. Asymmetric Digital Subscriber Line (ADSL) is another type of DSL communication technology that generally adheres to a separate ITU G.992 standard. Thus, although VDSL and ADSL are both variants of DSL some techniques used in VDSL may not be useable in ADSL because they adhere to two different standards, which include different protocols, frequency ranges, connection speeds, etc.

SUMMARY

Various methods and apparatuses are described. In an embodiment, a DSL communication device comprising a line interface circuit is disclosed. The line interface circuit includes a hybrid circuit to interface the communication device to a communication line, a lowpass transmit filter to pass signals in a first frequency band, and a highpass transmit filter to pass signals in a second frequency band. The second frequency band is higher in frequency than the first frequency band. The outputs of the highpass and lowpass filters are coupled in parallel to the communication line. The lowpass and highpass filters as well as the low and highpass transformers may be optimized for their frequency bands. Further, the edges of the low and high frequency bands may be sufficiently separated to reduce interference from the other frequency band. These factors, in part, allow the DSL communication device to be capable of operating in multiple modes of operation with multiple DSL varieties.

BRIEF DESCRIPTION OF THE DRAWINGS

The present invention is illustrated by way of example and not limitation in the figures of the accompanying drawings, in which like references indicate similar elements. The drawings refer to embodiments of the invention.

Figure 1:
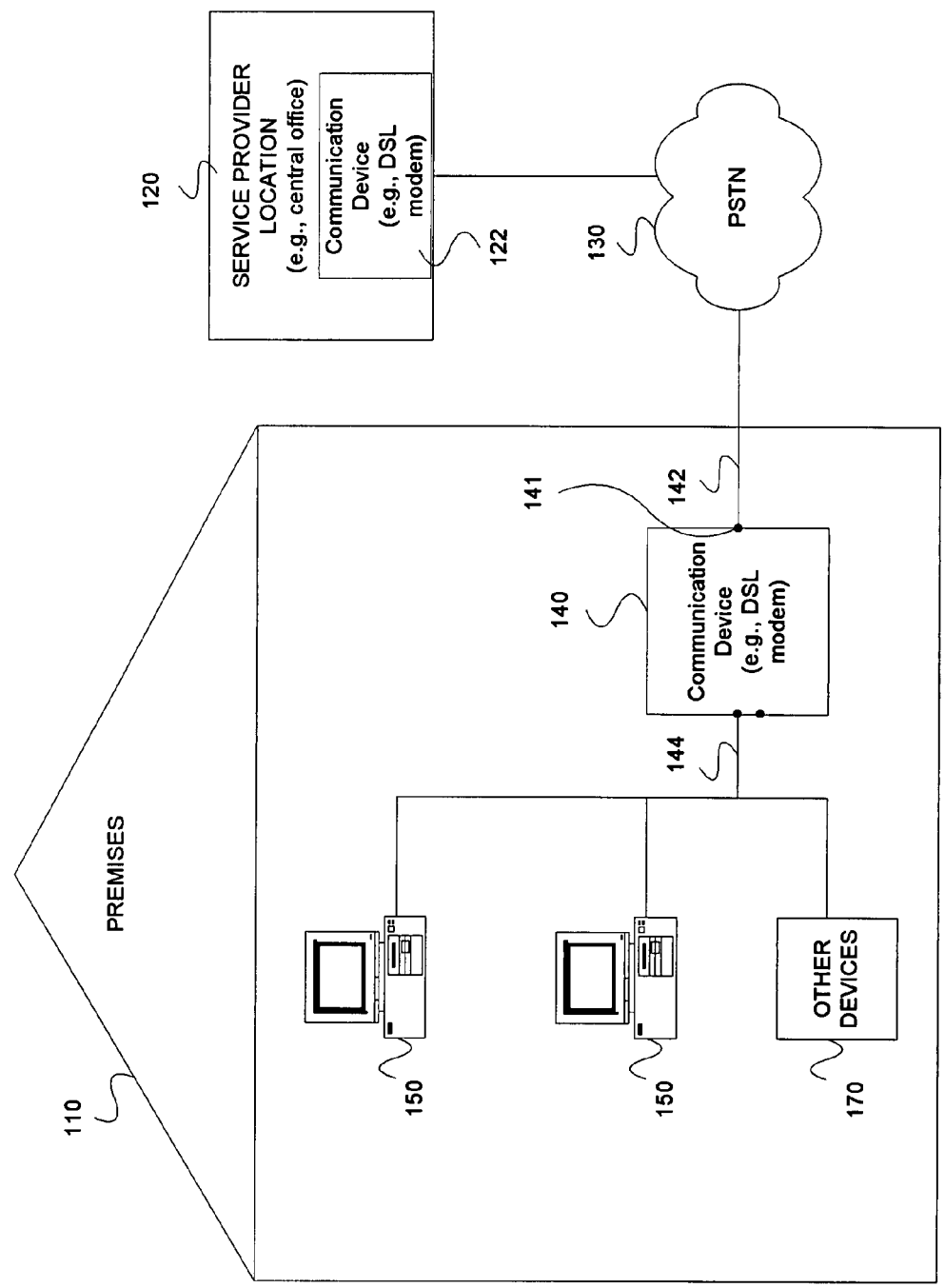
FIG. 1 illustrates a block diagram of an embodiment of a communication system.

Although the invention is subject to various modifications and alternative forms, specific embodiments thereof have been shown by way of example in the drawings and will herein be described in detail. The invention should be understood to not be limited to the particular forms disclosed; on the contrary, the intention is to cover all modifications, equivalents, and alternatives falling within the spirit and scope of the invention.

DETAILED DESCRIPTION

In the following description, numerous specific details are set forth, such as examples of specific protocols, variants of DSL such as an example ADSL and VDSL, named components, connections, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Furthermore, specific numeric references, such as 'first frequency band,' may be made. However, the specific numeric reference should not be interpreted as a literal sequential order but rather interpreted that the first frequency band is different from a second frequency band. Thus, the specific details set forth are merely exemplary. The specific details may be varied from those presented and still be contemplated to be within the spirit and scope of the present invention. The term "coupled" is defined to mean connected either directly to the component or indirectly to the component through another component.

In general, various methods, apparatuses, and systems are described in which a line interface circuit includes a hybrid circuit and transmit filtering. A lowpass transmit filter operates over a first frequency band, and a highpass filter operates over a second, higher-frequency band. The outputs of the lowpass and highpass filters are coupled in a parallel configuration to a communication line. Separate transmit transformers are used to couple the first frequency band and second frequency band to the communication line. Also, a separate receive transformer is used in the receive path. The transmit transformer that couples the first frequency band to the line has a frequency response configured substantially to pass the first frequency band. Likewise, the transmit transformer that couples the second frequency band to the line has a frequency response configured substantially to pass the second frequency band. The lowpass and highpass filters as well as the low and highpass transformers may be optimized for their frequency bands. Further, the edges of the low and high frequency bands may be sufficiently separated to reduce interference from the other frequency band. These factors, in part, allow a DSL communication device to be capable of operating in multiple modes of operation with multiple DSL varieties.

FIG. 1 illustrates a block diagram of an embodiment of a communication system. Communication device 140, which may be a DSL modem, is located at subscriber premises 110 at one end of communication line 142. The part of communication line 142 coupled to communication device 140 at subscriber premises 110 may be a twisted-pair line capable of providing plain old telephone service (POTS) via the public switched telephone network (PSTN) 130, e.g., communication line 142 may be what is known as a local loop. Subscriber communication device 140 may be coupled via local network 144 to other devices in the subscriber premises, which may include computers 150 or other devices 170, such as telephones, fax machines, etc. Local network 144 may be any type network, including a wired network (e.g., Ethernet, universal serial bus (USB), etc.) or a wireless network (e.g., IEEE 802.11, Bluetooth, etc.).

Coupled to the other end of communication line 142, situated at service provider location 120 (which may be, for example, a central office, remote terminal, or other location where a service provider might place DSL equipment), is another communication device 122. Communication device 122, which may be a DSL modem, is capable of communicating with communication device 140.

Figure 2:
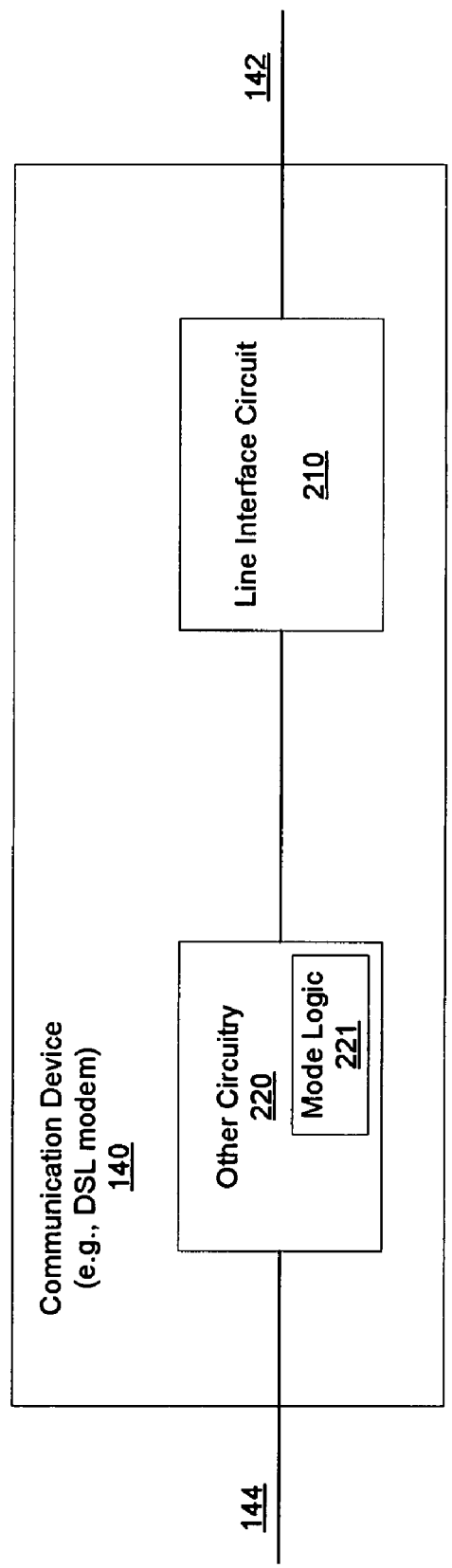
FIG. 2 is a block diagram of an embodiment of a communication device.

FIG. 2 illustrates a block diagram of an embodiment of a communication device. A DSL modem, such as communication device 140 or communication device 122, contains hardware components to transmit and receive signals via a communication line.

A DSL modem may have hardware in two parts, as shown in FIG. 2. For simplicity, functionality is discussed with reference to communication device 140; however, most of the discussion can also apply to communication device 122. Some hardware of communication device 140 comprises line interface circuit 210, and other hardware is other circuitry 220. One function of line interface circuit 210 is to couple communication device 140 to communication line 142. One function of other circuitry 220 is to couple communication device 140 to the subscriber's external hardware via local network 144. In an embodiment, the other circuitry contains mode logic 221. The mode logic 221 has circuitry to detect and control whether the DSL modem operates as either an ADSL modem or as a VDSL modem, depending on the detected characteristics of a device on the other end of the communication line. If the mode logic 221 detects that the device on the other end of the communication line is operating as an ADSL modem, then the DSL modem also operates in ADSL mode, whereas if mode logic 221 detects that the device on the other end of the communication line is operating as a VDSL modem, the then the DSL modem operates in VDSL mode.

VDSL modems allow transmission of bit rates that exceed the bit rates achievable using most other types of digital subscriber line (DSL) systems, including ADSL, the symmetric high-speed digital subscriber line (SHDSL), and the integrated digital services network (ISDN). To achieve significantly higher bit rates than other types of DSL, VDSL may be deployed on lines that are a short distance from the central office to a subscriber's location, which tend to have useful bandwidth at frequencies above the frequency range spanned by ADSL.

In contrast to other DSL standards that define a single frequency band for downstream (from the service provider to the subscriber) transmissions and a single frequency band for upstream (from the subscriber to the service provider) transmissions, very high-bit-rate digital subscriber line (VDSL) standards, such as the international ITU-T Recommendation G.993.2, define multiple downstream and multiple upstream bands. For example, in Annex A of G.993.2, which defines VDSL operation over plain old telephone service (POTS), the lowest upstream band, known as US0, spans a bandwidth from approximately 25 kHz to a frequency between approximately 138 kHz and 276 kHz. This band substantially coincides with the single upstream band defined for the asymmetrical digital subscriber line (ADSL) deployed over POTS. VDSL Recommendation G.993.2 also defines additional upstream bands, known as "USx," where "x" is an integer greater than zero, which are located above US0 in frequency. The lower and upper frequencies that define the positions of the upstream bands vary among geographical regions.

The communication device 140 may use a dedicated transformer to couple the lowest-frequency band (known in the industry as US0) to the public phone line and using a second separate transformer to couple the rest of the frequency bands (US1, US2, etc.) to the public phone line, near-optimal performance is achievable in both bands. The frequency response range for each transmit transformer may be optimized for its own transmit frequency band. If a single transformer were used, the designer would have to make a decision to optimize one band or the other, or choose a compromise transformer that is not optimized for either band, because current manufactured transformers generally do not have the desired frequency response over the large frequency range of VDSL. The problem thus results because VDSL spans such a wide bandwidth.

In the downstream direction, ADSL transceivers may transmit in a band defined by a lower frequency in the range of approximately 138 kHz to 276 kHz and an upper frequency in the range of approximately 1.1 MHz to 2.2 MHz. However, VDSL standards define more than one downstream band. Downstream bands are typically located between consecutive upstream bands. For example, in Annex A of G.993.2, the band DS1 lies between US0 and US1, and the band DS2 lies between US1 and US2. The band DS1 overlaps and extends beyond the bandwidth of the downstream band used in ADSL.

Even if upstream transmission is constrained by standards to different frequency bands from those used for downstream transmissions, any finite-duration signal by definition cannot be strictly band-limited in the frequency domain. Therefore, DSL modems may include transmit filters to attempt to confine the transmitted signal to a particular band, and receive filters to attempt to limit out-of-band noise entering the receiver.

However, even when transmit and receive bands are disjoint, and transmit and receive filters are used, the received signal may still be corrupted by the transmitted signal. First, transmit and receive filters may have non-ideal characteristics, which may arise from design cost or complexity constraints. As a result of the non-ideal filter characteristics, signals in transmit bands may interfere with received signals. Furthermore, if the impedance of the communication line, which is a function of frequency, is not precisely matched by the DSL modem, this impedance mismatch may cause a portion of the transmit signal to be reflected back to the receiver.

In the DSL modem, a hybrid in the line interface circuit 210, also known as a 2-to-4 wire converter, may be used to attempt to match the impedance of the modem to the impedance of the line. A perfect hybrid would match the line impedance exactly and thereby entirely eliminate all vestiges of the transmitted signal from receive bands. In practice, however, a hybrid circuit may not perfectly match the impedance of a line.

ADSL and VDSL may both use the same modulation, namely discrete multi-tone (DMT) with sub-carriers spaced at multiples of 4.3125 kHz and have some frequency band overlap. This realization allows for a multi-mode device. A multi-mode device in the context of ADSL and VDSL is capable of operating as either an ADSL modem or as a VDSL modem, depending on the characteristics of the device on the other end of the line. As discussed, if the device on the other end of the line is operating as an ADSL modem, a multi-mode device also operates in ADSL mode, whereas if the device on the other end of the line is operating as a VDSL modem, the multi-mode device operates in VDSL mode. Multi-mode devices are desirable because they can be installed by service providers without regard to whether loops have sufficient bandwidth to support VDSL bit rates. However, in scenarios where loops are known to be too long to support VDSL, deployment of dedicated ADSL modems may be desirable.

The implementation of a multi-mode device rather than a single-mode (i.e., either ADSL or VDSL) device may result in performance degradations caused by the need to couple the transceiver to the physical line, which is achieved using a transformer. Use of a single transformer to couple both the transmit and receive bands to the line is desirable to minimize cost, but performance may be compromised by this approach. In order to support the lowest band, which may be US0 in a VDSL application, the transformer must have a large enough primary inductance. However, a practical transformer with a large enough primary inductance to support the lowest band may have a high leakage inductance, which limits the high-frequency response of the transformer. Thus, using conventional approaches, a designer of a multi-mode device may have to choose to optimize performance in the lowest band at the expense of performance in the higher bands, or optimize performance in the higher bands at the expense of performance in the lowest band. As a consequence, a multi-mode device may provide good performance when operating as a VDSL modem but compromised performance when operating as an ADSL modem, or it may provide good performance when operating as an ADSL modem but compromised performance when operating as a VDSL modem. Neither alternative is desirable. Thus, more thought needs to go into how to integrate multiple DSL variants into the same hardware platform, such as where and how to connect the signal paths, frequency band selection, and circuit values and configuration to reduce interference between the frequency bands.

An embodiment of the multi-mode modem 140 has a combination of a hybrid and transmit filtering for a communication system that transmits signals in more than one frequency band. The lower and upper frequency bands are coupled to the public phone line in parallel. Generally, a single phone plug is used as the single input-output plug to the public phone line. Normally such a configuration would result in one of the paths loading the other, but partially because the upper edge of the lower band and the lower edge of the higher band are separated by several octaves, and partly because of choosing filter components carefully, the paths can be designed to present high impedance to each other. So, the performance in the low-frequency path is basically the same regardless of whether the high-frequency path is present, and vice versa. As a result, without affecting performance in any band, manufacturers can fabricate a single board and populate that board with (a) only low-frequency path components, (b) only high-frequency components, or (c) both sets of components. In other words, a manufacturer can design a single board and then solder in selected transformer and filters electronic components into their prefabricated places on the board to become (a) only an ADSL modem, (b) only a short-reach VDSL modem, or (c) a multi-mode modem that interoperates with both ADSL and VDSL modems (depending on what kind of modem is on the other end of the line).

Thus, an embodiment of the multiple tone communication device 140, such as a DSL modem, may have a line interface circuit that includes a hybrid circuit with both transmit transformers and a receive transformer to interface the DSL modem to a communication line. The hybrid circuit further includes a lowpass transmit filter that has lowpass functionality to confine a transmit signal through an output of the lowpass transmit filter to a first frequency band, and a highpass transmit filter that has highpass functionality to confine a transmit signal through an output of the highpass transmit filter to a second frequency band. The second frequency band is higher in frequency than the first frequency band. Also, the outputs of the highpass and lowpass transmit filters are coupled in parallel on the communication line side of the hybrid circuit. The outputs of the highpass and lowpass transmit filters that are coupled in parallel on the communication line side of the hybrid circuit are electrically in series with the first input-output communication line plug 141, such as a phone jack, for the multiple tone communication device. The lowpass and highpass filters as well as the low and highpass transformers are optimized for their frequency bands. Further, the edges of the low and high frequency bands are sufficiently separated to reduce interference from the other frequency band. For example, the upper edge of the first frequency band confined to pass through the lowpass transmit filter and the lower edge of the second frequency band confined to pass through the highpass transmit filter are sufficiently separated to reduce interference from the other frequency band. These factors, in part, allow the multiple tone communication device to be capable of operating in multiple modes of operation with multiple DSL varieties.

In an embodiment, the transmit path is split into two bands to allow optimization of transformer parameters while at the same time not using more transformers than are necessary for a cost effective design. Additionally a parallel lowpass and highpass structure will allow high performance and commonality between ADSL-only and VDSL designs.

Figure 3:
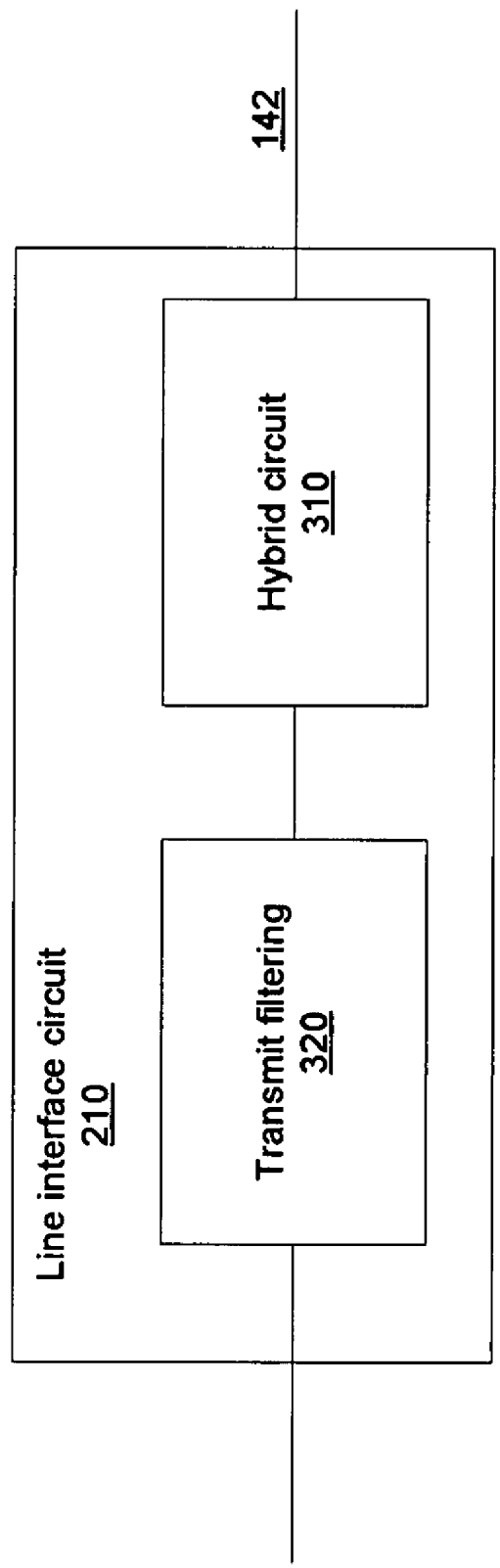
FIG. 3 shows a functional block diagram of an embodiment of a line interface circuit.

FIG. 3 shows a functional block diagram of an embodiment of a line interface circuit. The functionality of line interface circuit 210 can be partitioned into two parts. First, line interface circuit 210 includes hybrid circuit 310, which attempts to match the impedance of communication device 140 to the impedance of communication line 142 and thereby eliminate any reflection of transmitted signals back to the receiver of communication device 140. In a frequency-division duplexed system, in which the frequency bands used for transmission are disjoint from the frequency bands used for reception, a perfect hybrid would entirely eliminate the transmitted signal from the received signal.

Figure 4:
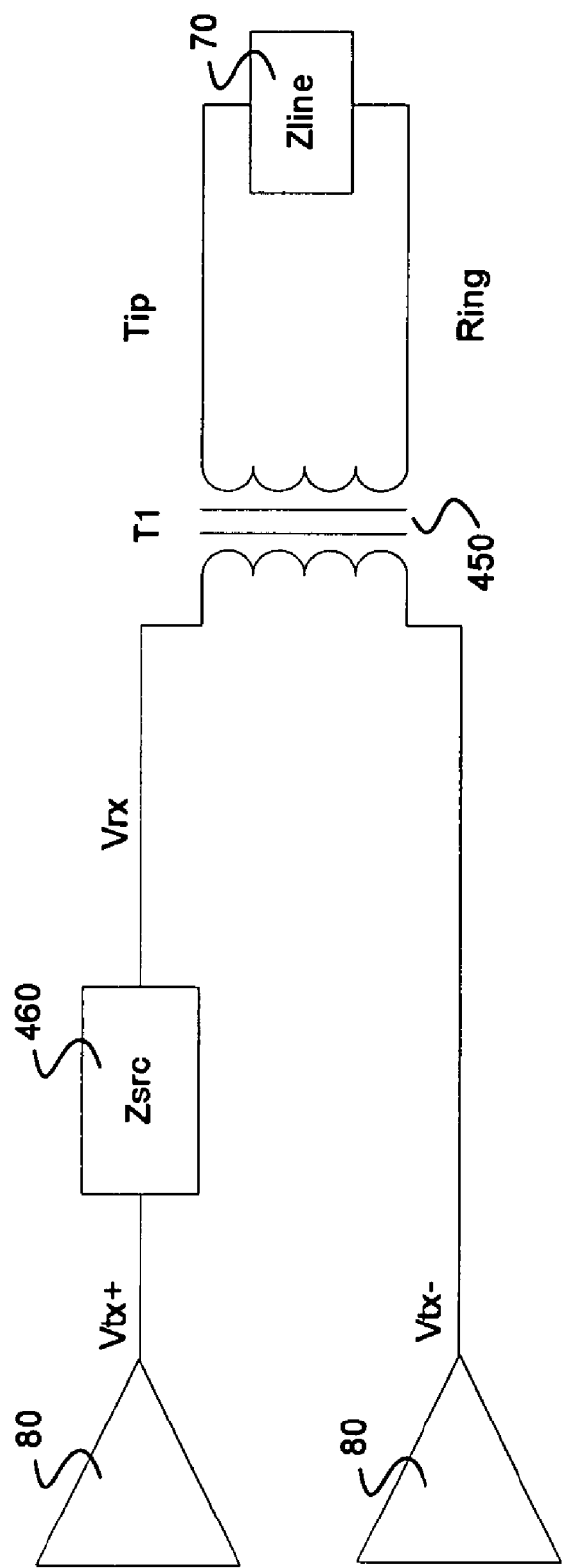
FIG. 4 illustrates a diagram of a simple hybrid circuit.

FIG. 4 illustrates a diagram of a simple hybrid circuit, which includes line driver amplifiers 80, transformer 450, source impedance Zsrc 460, and line impedance Zline 70. All node voltages shown are relative to ground. Vtx+ and Vtx− compose a complimentary differential signal produced by line driver amplifiers 80, and Vrx is the receive signal. TIP and RING are names of the two wires that may constitute the twisted-pair communication line. This twisted-pair line may be referred to as the local loop, subscriber loop, subscriber line, or telephone line.

If transformer 450 were an ideal 1:1 transformer, and if source impedance Zsrc 460 matched line impedance Zline 70 under all conditions, the hybrid circuit shown in FIG. 4 would be a perfect voltage divider, and the differential transmit signal would be split in half. Under these ideal conditions, voltage Vrx would be zero, which would mean the transmit signal was completely canceled from the received signal. In practice, however, transformer 450 may have significant magnetizing and leakage inductances and consequently may not be an ideal 1:1 transformer. Thus, a hybrid circuit such as the one shown in FIG. 4 may not be a perfect voltage divider under all conditions, and the cancellation provided by such a circuit may vary significantly across a range of frequencies. As a result, in DSL applications the transmit signal may be reflected back to the receiver because of the impedance mismatch between the DSL modem and the communication line. If the reflected transmit signal has energy in the band used to receive signals, this energy may appear as noise to the receiver and thus degrade receiver performance.

The communication device may separate transmit and receive signals so that as much as possible of the transmit band signals are cancelled from the receive band signals. This can be necessary because the transmit and receive filters are less than ideal, which causes a certain amount of one band's signal to leak into another band. As discussed, the leakage will appear as noise to the other band and degrade performance. It is the combination of hybrid cancellation and filtering that sets the dynamic range performance of the communication device.

Because finite-duration signals are not strictly band-limited in the frequency domain, in one embodiment, such as represented by FIG. 3, transmit filtering 320 may be included in line interface circuit 210 to attempt to confine finite-duration transmit signals to particular frequency bands, thereby reducing the amount of energy leaking out of prescribed transmit bands and reflecting back into the receiver due to non-ideal performance of the hybrid circuit. In DSL modems, the effectiveness of the combination of the hybrid and transmit filtering in mitigating interference from the transmit signal to the receive signal contributes to the dynamic range of the receiver. A higher dynamic range, which results from more effective elimination of the transmit signal from the receive signal, translates to a higher receiver sensitivity and thus to a higher possible receiver signal-to-noise ratio (SNR). In turn, a higher receiver SNR may translate to a higher data capacity or a higher noise margin at a fixed data rate. Thus, the combined performance of the hybrid and transmit filtering may have an impact on the performance of the overall DSL system.

In some hybrid circuit configurations, it may be difficult to achieve enough noise cancellation for the line interface circuit to provide acceptable performance, even with transmit and receive filtering. A reason for this difficulty can be the fact that a transformer is needed to couple the transmitter and receiver to the line, and practical transformers have non-ideal properties. When a real transformer is placed between Zsrc and the line, as in FIG. 4, for example, in effect the combination of Zsrc and the transformer must match the impedance of the line. Thus, it may be difficult to design Zsrc because the transformer likely does not have an ideal frequency response. In particular, the transformer has a finite amount of magnetizing inductance as well as leakage inductance. To a lesser effect, non-linearity of the transformer also increases the difficulty of achieving enough noise cancellation.

Figure 5:
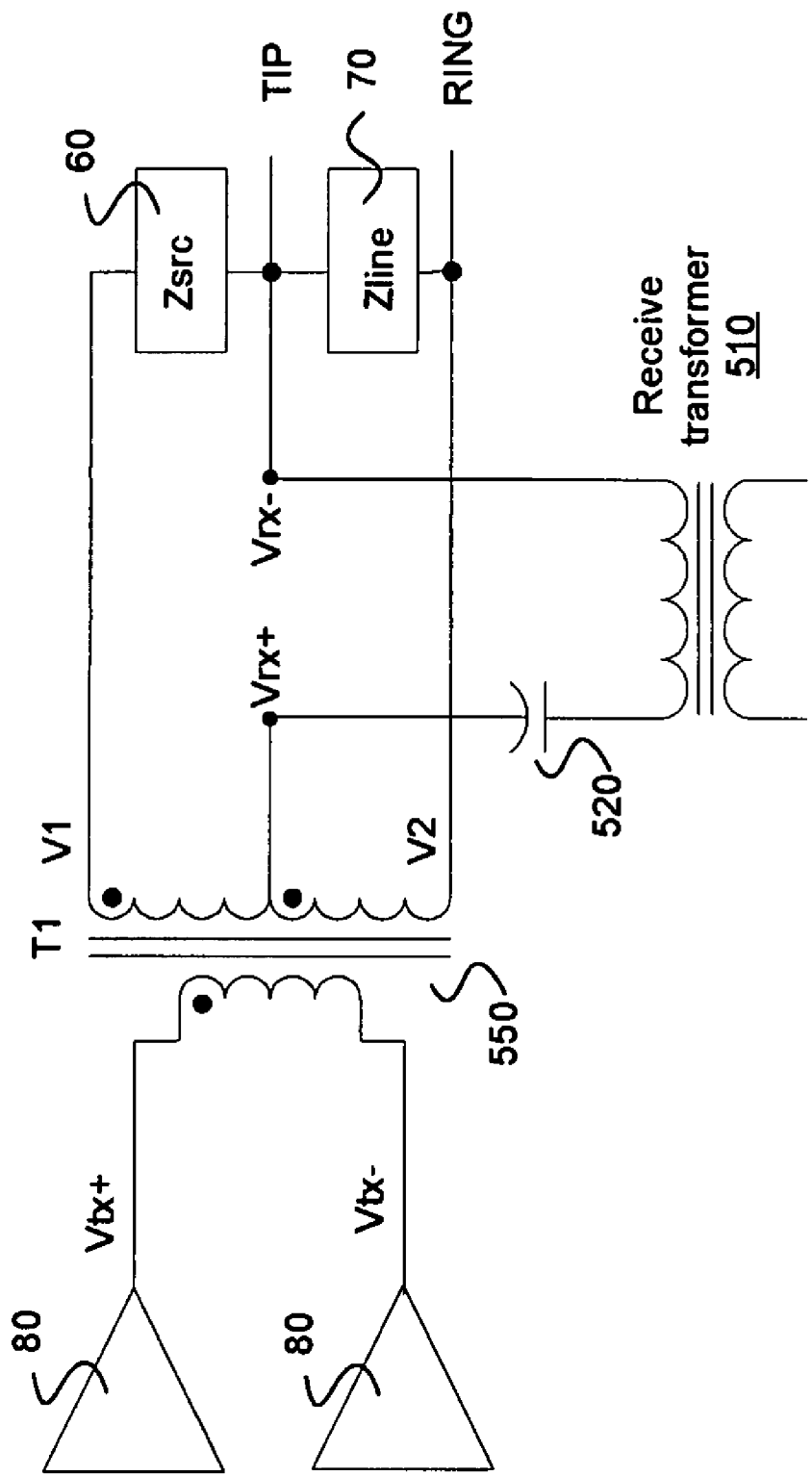
FIG. 5 illustrates a diagram of an alternative hybrid circuit configuration.

To address these problems, an alternative hybrid topology may be used. FIG. 5 illustrates a diagram of an alternative hybrid circuit configuration, which is a bridge configuration for a hybrid in a line interface circuit. By moving source impedance Zsrc to the line side of the transformer, Zsrc no longer has to account for the transformer's frequency response and can be designed to match line impedance Zline more accurately than when the transformer resides between Zsrc and the line. Note that Zsrc could be situated between the line side windings of transformer 550 instead, because the components are connected in series and may be interchanged.

Referring to FIG. 5, the two line side windings of transformer 550 are equal so that voltages V1 and V2 are symmetrical and equi-potential about Vrx+, and source impedance Zsrc 60 matches the impedance of the communication line seen across TIP and RING, Zline 70. Zsrc 60 may be composed of a combination of resistors, inductors, and capacitors. At least one capacitive component is necessary in Zsrc to block the effects of direct current (DC) voltage. Under these conditions, the bridge nulls out the transmit signal as seen by receive signals Vrx+ and Vrx−. However, moving Zsrc to the line side of transformer 550 may impose a requirement for receive transformer 510 in the receive path. Capacitor 520 is also needed in series with the receive transformer to block the effects of DC voltage. Capacitor 520 can be coupled to either leg of receive transformer 510. The configuration of FIG. 5 works well for systems such as ADSL, which has just one upstream band and one downstream band.

Figure 6A:
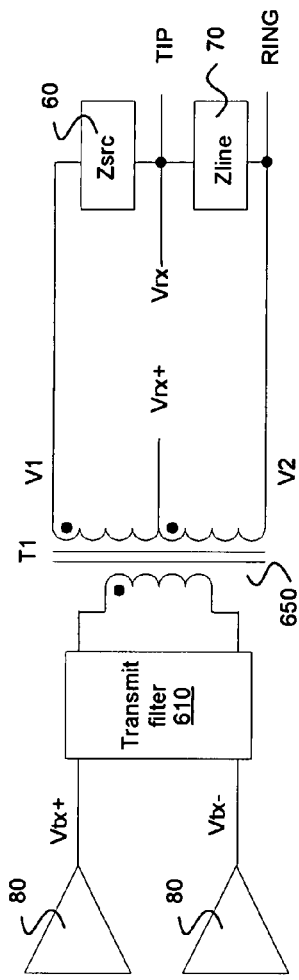
FIGS. 6A and 6B shows diagrams of hybrid circuit configurations with transmit filtering.
Figure 6B:
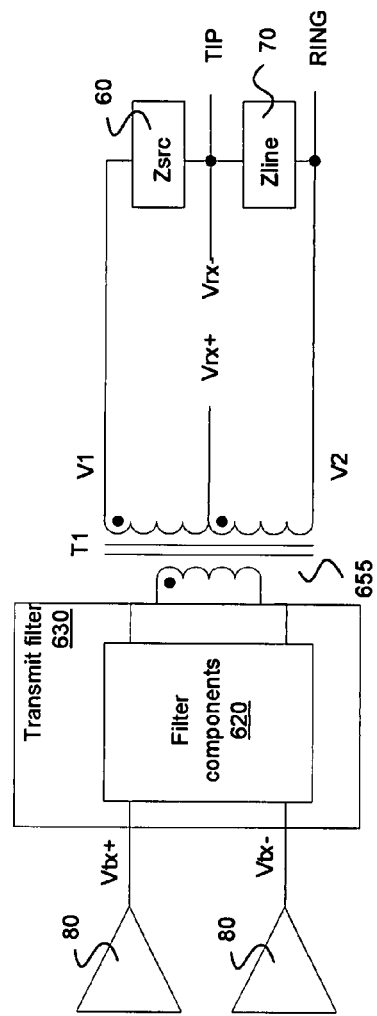

FIGS. 6A and 6B shows diagrams of hybrid circuit configurations with transmit filtering. As illustrated by FIG. 6A, transmit filter 610 may be inserted between transmit line driver amplifier 80 outputs Vtx+ and Vtx− and the device side winding of transmit transformer 650 to assist further in isolating the transmit signal from the receive signal. The receive transformer connects in at Vrx+ and Vrx−. An advantage of placing the transmit filter after the line driver in the signal path is that noise and distortion caused by the line driver may be rejected by the filter.

As shown in FIG. 6B, transformer 655 may be integrated into transmit filter 630, where the inductance and capacitance values of the primary windings of transmit transformer 655 acts as part of the filter. A transformer-coupled version of the transmit filter 630 also serves as TNV isolation circuits, allowing efficient use of components. By implementing a filter that follows the line driver in the signal path and also incorporates the inductance of the transmit transformer, this configuration may allow efficient use of hardware components. (Note, the Receive Transformer is not Shown.)

VDSL standards specify multiple upstream bands and multiple downstream bands. The conventional approach in DSL modem design may be generally to use a single transformer to couple all transmit bands to a line. However, this approach may have a drawback in VDSL because designing a transformer with a wide enough passband to accommodate VDSL signals that may span from approximately 25 kHz to more than 10 MHz may be difficult. In particular, if the transformer has a large enough inductance to support the lowest-frequency band, the leakage inductance may compromise the transformer's high-frequency response, which may reduce the SNR at higher frequencies and thus compromise the capacities of higher bands. With such a transformer, the performance of a VDSL modem would be satisfactory on long loops, on which lower frequencies are most important, but less satisfactory on short loops, on which the higher frequencies are more important. Conversely, if the transformer is selected such that its frequency response has a minimal impact on the SNR at higher frequencies, the inductance of the transformer may not be large enough to support the lowest-frequency band without causing a reduction in the SNR in that band. In this case, the performance of the VDSL modem would be satisfactory on short loops and less satisfactory on longer loops. Thus, a VDSL modem designer using a single transformer to couple the transmit signal to the line may have to prioritize short-loop performance over long-loop performance, or vice versa, or have to compromise performance on both short and long loops.

ADSL modems may include a lowpass filter in the signal path of the upstream transmitter to confine the transmitted upstream signal to the desired frequency band and to facilitate improved downstream receiver performance by reducing the impact of reflected energy caused by any impedance mismatch that exists between the ADSL transceiver and the communication line. For VDSL, however, several upstream bands have been defined in standards and may need to be transmitted, which changes transmit filtering requirements. To use a single transformer to couple the transmit signal to the line, and transmit, for example, the US0 and US1 bands, a band-reject transmit filter with a stopband extending over the bandwidth of DS1 would be needed. Implementation of a band-reject filter may be complicated, and as mentioned previously the use of a single transformer over the wide bandwidth available to VDSL transceivers may cause performance degradations because the transformer is unlikely to provide a satisfactory frequency response over the entire transmit bandwidth.

An alternative approach is to use separate transformers to couple each transmit band to the line, where the frequency response of each transformer has been configured specifically for its respective band. A separate transmit filter could then operate over the bandwidth of each band. The disadvantage of this approach is that the number of transformers required increases with the number of transmit bands. Furthermore, bandpass filters would be required for some of the transmit bands, and bandpass filters may be difficult to design or expensive to build. Thus, to support all defined G.993.2 upstream bands, for example, a compliant VDSL modem would require three transmit transformers and at least two bandpass filters, which may be expensive and may require more physical space than a design with fewer transformers.

Thus, in an embodiment, a separate transformer for each of the three (or four) upstream bands would be ideal. In practice, using just two transformers—one for US0 and a second for US1, US2 (and US3 if used), is sufficient to address the practical limits of transformer design. The multiple mode communication device incorporates the first transformer into the transmit lowpass filter, and incorporates the second transformer into the transmit highpass filter to generate an efficient and cost effective topology with high performance.

A balance between performance and cost may be struck. The transmit signal path is split into two paths: the low-frequency path and the higher-frequency path. The low-frequency path passes the lowest-frequency transmit band (a first frequency band), and the higher-frequency path passes the remaining, higher-frequency transmit bands (a second frequency band). The first frequency band is coupled to the communication line by a transmit transformer that has a desired frequency response in the first frequency band, such as optimized specifically for the first frequency band. The second frequency band is coupled to the communication line by a second transmit transformer that exhibits a desired frequency response in the second frequency band. Separate transmit filters are applied in the low-frequency and higher-frequency paths to reduce further the effect of the transmit signal on the receive signal and thus to improve dynamic range. A separate receive transformer is used in the receive path.

Figure 7:
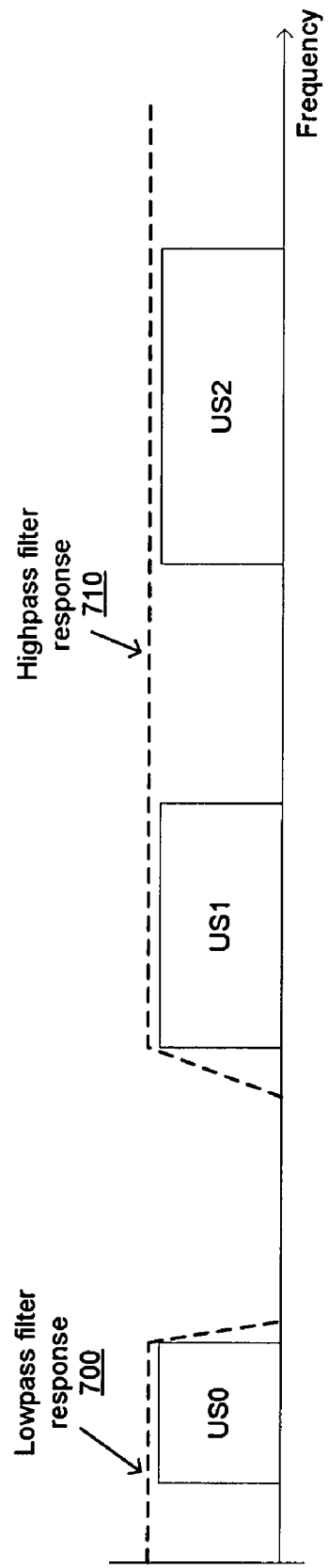
FIG. 7 illustrates a frequency diagram of the operation of an embodiment of a communication device to the upstream bands of a VDSL system.

FIG. 7 illustrates a frequency diagram of the operation of an embodiment of a communication device to the upstream bands of a VDSL system. The low-frequency path may include a lowpass filter with a cutoff frequency selected to coincide approximately with the upper band-edge frequency of the lowest-frequency transmit band. The higher-frequency path includes a highpass filter with a cutoff frequency selected to coincide approximately with the lower band-edge frequency of the lowest-frequency transmit band within the second frequency band. Using VDSL terminology, in one embodiment of the invention, the lowpass filter cutoff frequency approximately coincides with the upper band-edge frequency of the US0 band, and the highpass filter cutoff frequency approximately coincides with the lower band-edge frequency of the US1 band. Thus, the lowpass filter 700 substantially passes the US0 band, and the highpass filter 710 substantially passes the US1 and US2 bands. For example, the lowpass transmit filter has a cutoff frequency in the range from approximately 138 kHz to approximately 512 kHz to form the first frequency band. Likewise, the highpass transmit filter has a cutoff frequency of approximately 3.75 MHz to form the second frequency band. The lowpass transmit filter may pass the VDSL upstream band known as US0 in the first frequency band. The highpass transmit filter may passes other VDSL upstream bands in the second frequency band.

The multiple mode communication device may provide adequate filtering and separate transformers for separate bands with a cost effective design. In addition, the multiple mode communication device advantageously has commonality between an ADSL-only design and a design that supports both VDSL and ADSL.

For ADSL annex A, a transmit lowpass filter, with a cutoff frequency of approximately 138 KHz is typically required to achieve optimum downstream performance in the receive path. For VDSL, the requirement is slightly different. VDSL requires a transmit band-reject filter in the downstream 1 band (DS1) to achieve optimum performance. DS1 is from 138 KHz to 3.75 MHz. A band-reject filter for the DS2 band would be desirable but is not as necessary.

The design of the multiple mode communication device recognizes the similarity of these two frequency requirements for ADSL and VDSL. The multiple mode communication device has a circuit structure that implements the transmit band-reject filter for VDSL as a parallel combination of a lowpass filter at 138 KHz and a highpass filter at 3.75 MHz. This way, the same ADSL transmit lowpass filter can be common to both ADSL and VDSL designs. Then, to make the design support VDSL, the parallel transmit highpass filter section can be added.

In general, making a filter out of parallel sections is troublesome due to the difficulty in combining the outputs of the parallel sections. The multiple mode communication device offers a way of solving this problem while at the same time addressing the desirability of using multiple transformers to couple the transmit signal to the line, each optimized for its own frequency band.

Figure 8A:
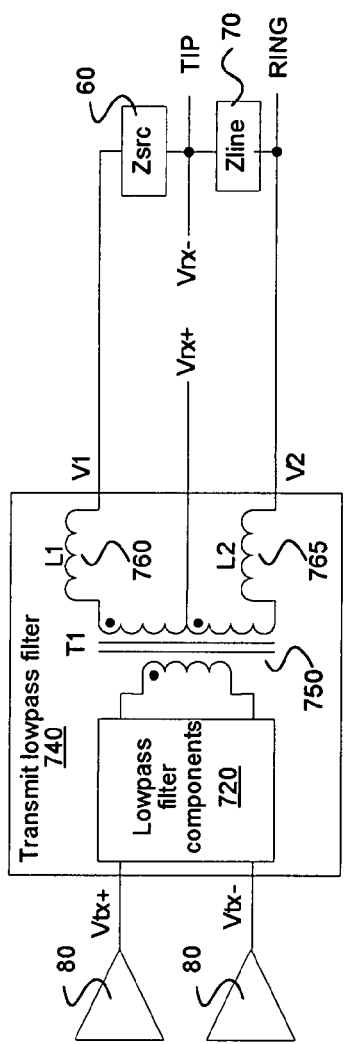
FIGS. 8A and 8B illustrates schematic diagrams of an embodiment of a hybrid circuit configuration with lowpass and highpass filters.
Figure 8B:
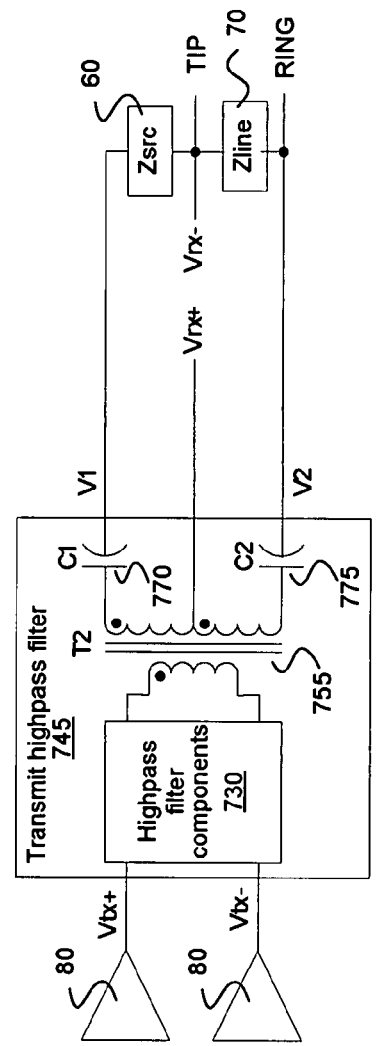

FIGS. 8A and 8B illustrates schematic diagrams of an embodiment of a hybrid circuit configuration with lowpass and highpass filters. The transformer in the low-frequency path may be incorporated into the lowpass filter, and the transformer in the higher-frequency path is incorporated into the highpass filter. FIGS. 8A and 8B illustrate how the structure of FIG. 6B can be augmented to produce either a lowpass or a highpass filter. In FIG. 8A, the use of inductive components 760 and 765 on the line side of transformer 750 and appropriately selected lowpass components 720 on the device side of transformer 750 produces lowpass filter 740. The values of the lowpass filter components 720 are selected to implement a lowpass filter with a desired frequency response. Inductive components 760 and 765 can be either discrete components or they can include the uncoupled leakage inductance of transformer 750 and be used to determine its frequency response. The magnetizing inductance of transformer

750 may also be part of lowpass filter 740, or the magnetizing inductance may simply be scaled to reflect impedances and couple energy.

As shown in FIG. 8B, the use of capacitive components on the line side of transformer 755 and appropriately selected highpass filter components 730 on the device side of transformer 755 produces highpass filter 745. The magnetizing inductance of transformer 755 may be part of highpass filter 745, or the magnetizing inductance may simply be scaled to reflect impedances and couple energy. Highpass filter components 730 are selected to achieve a filter with the desired frequency response.

Figure 9:
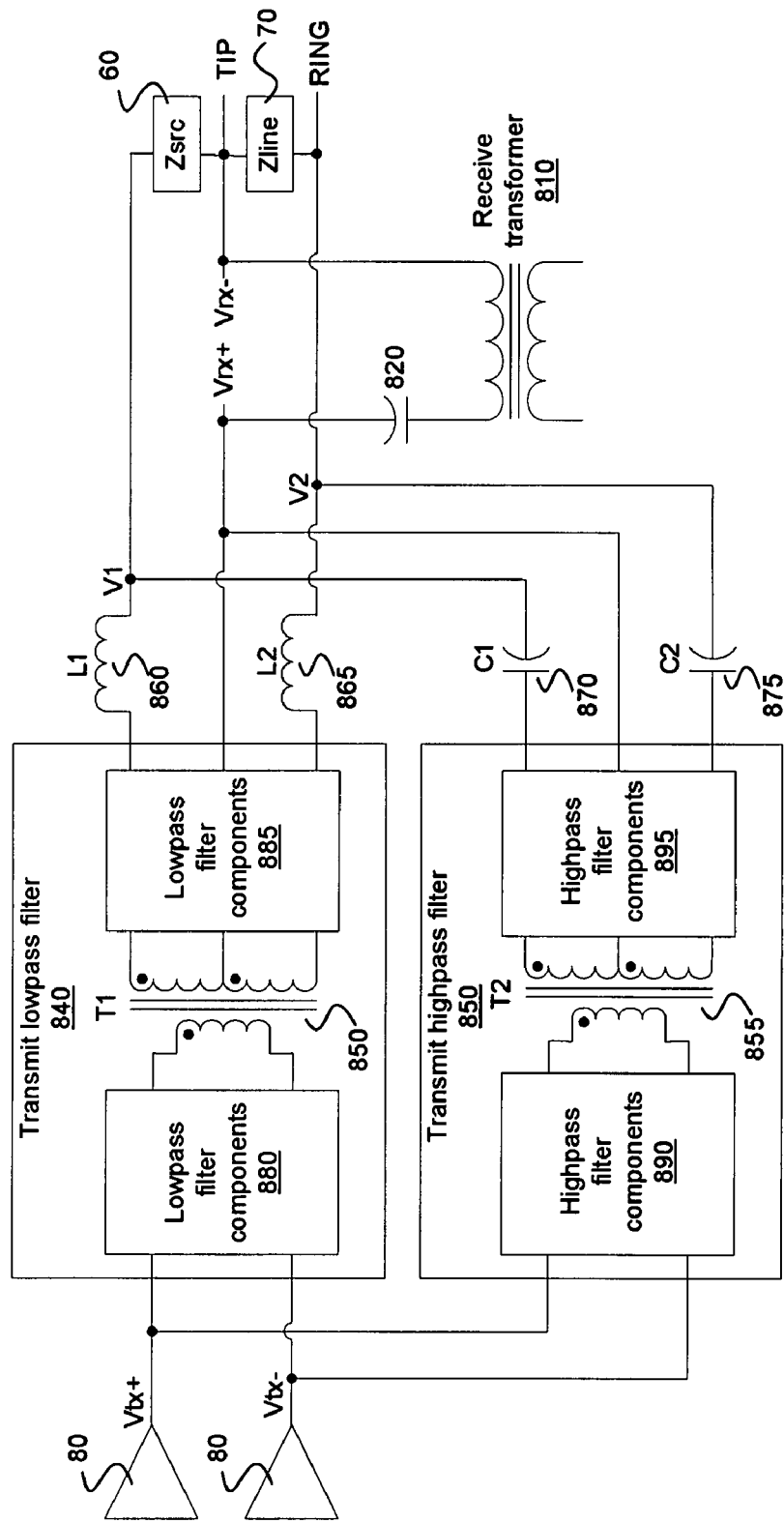
FIG. 9 illustrates a schematic diagram of another embodiment of a hybrid circuit configuration with lowpass and highpass filters.

FIG. 9 illustrates a schematic diagram of another embodiment of a hybrid circuit configuration with lowpass and highpass filters in which the low-frequency path and higher-frequency path outputs are combined in a parallel configuration.

The two distinct transformers transmit different frequency bands. The first transmit transformer has device side windings coupled to a line driver through the filter components and its communication line side windings coupled to the communication line through the inductors. The second transmit transformer has device side windings coupled to the line driver through the filter components and its communication line side windings coupled to the communication line through the inductors. The receive transformer has device side windings coupled to a receiver and its communication line side windings coupled to the communication line.

Combining filter sections in parallel can be troublesome because although transformers can be designed to have a desired frequency response within a particular bandwidth, transformers tend to have wideband characteristics. Therefore, the combination of the low-frequency and higher-frequency path outputs could result in the paths loading one another, depending on the impedances presented by the low-frequency and high-frequency paths. However, in one embodiment of the invention, the cutoff frequencies of the lowpass and highpass filters are sufficiently separated in frequency that components may be selected so that the highpass filter presents substantially high impedance in the lowpass band, and the lowpass filter presents substantially high impedance in the highpass band. Consequently, in one embodiment the lowpass path does not significantly load the highpass path, and the highpass path does not significantly load the lowpass path. Thus, cutoff frequencies and components of the lowpass and highpass transmit filters are selected so that the connection in parallel of the lowpass and highpass transmit filter outputs substantially does not load a frequency response of the lowpass transmit filter to leave the frequency response of the lowpass transmit filter approximately unchanged.

The lowpass and highpass path outputs are coupled in a parallel configuration, and the lowpass and highpass filters incorporate the transformers. Some components of lowpass filter 840 and highpass filter 850 are on the device sides of transformers 850 and 855, respectively, and others components 885 and 895 are on the line sides. Lowpass filter 840 and highpass filter 850 are shown as driven from the same differential transmit source, line driver amplifiers 80, but they could instead be driven from two separate sources. The differential outputs of the filters, including the center tap, are in parallel. Inductive components 860 and 865 are selected so the low-frequency path is substantially high impedance in the highpass band and therefore prevents the lowpass filter from significantly loading the highpass filter. Likewise, capacitive components 870 and 875 are selected so the higher-frequency path is substantially high impedance in the lowpass band and prevents the highpass filter from significantly loading the lowpass filter. Note that although the bounds of lowpass filter 840 and highpass filter 850 indicate that inductive components 860 and 865 and capacitive components 870 and 875 are excluded from the impedance components making up the filters, these components may be included in the filters, as shown in FIGS. 8A and 8B. Thus, 860 and 865 could be within the filter box 885 and similarly 870 and 875 could be within the filter box 895.

Receive transformer 810 is coupled to capacitive component 820, which blocks the effects of DC voltage. Likewise, source impedance Zsrc 60, as before, contains at least one capacitive component to block the effects of DC voltage. The impedance component Zsrc 60 couples to the communication line side windings of the receive transformer and the communication line side windings of the first transmit transformer. The impedance component also couples to the communication line side windings of the receive transformer in order to approximately matches an impedance value of the line to cancel the transmit signal from the receive signal.

The lowpass transmit filter couples to the device side windings of the first transmit transformer and also couples to the communication line side windings the first transmit transformer to form a telecommunications network voltage (TNV) isolation circuit and to shape the frequency range of the first frequency band. The highpass transmit filter may also couple to its transmit transformer to form a TNV isolation circuit and to shape the frequency range of the second frequency band.

Note, all, as shown in FIGS. 6B and 6B, or a portion, as shown in FIG. 9, of the lowpass transmit filter is coupled between a first transmit line driver output and the device side windings of a first transmit transformer. Similarly, all, as shown in FIGS. 6A and 6B, or a portion, as shown in FIG. 9, and a portion of the highpass transmit filter is coupled between a second transmit line driver output and the device side winding of the highpass transmit transformer and the line driver. Note, as shown in FIG. 9, the line driver may be composed of a first line driver and a second line driver driving the low and high pass transformers. In FIG. 9, the highpass transmit filter is coupled to both a transmit line driver output and is also coupled to the communication line side windings of the second transmit transformer.

Figure 10:
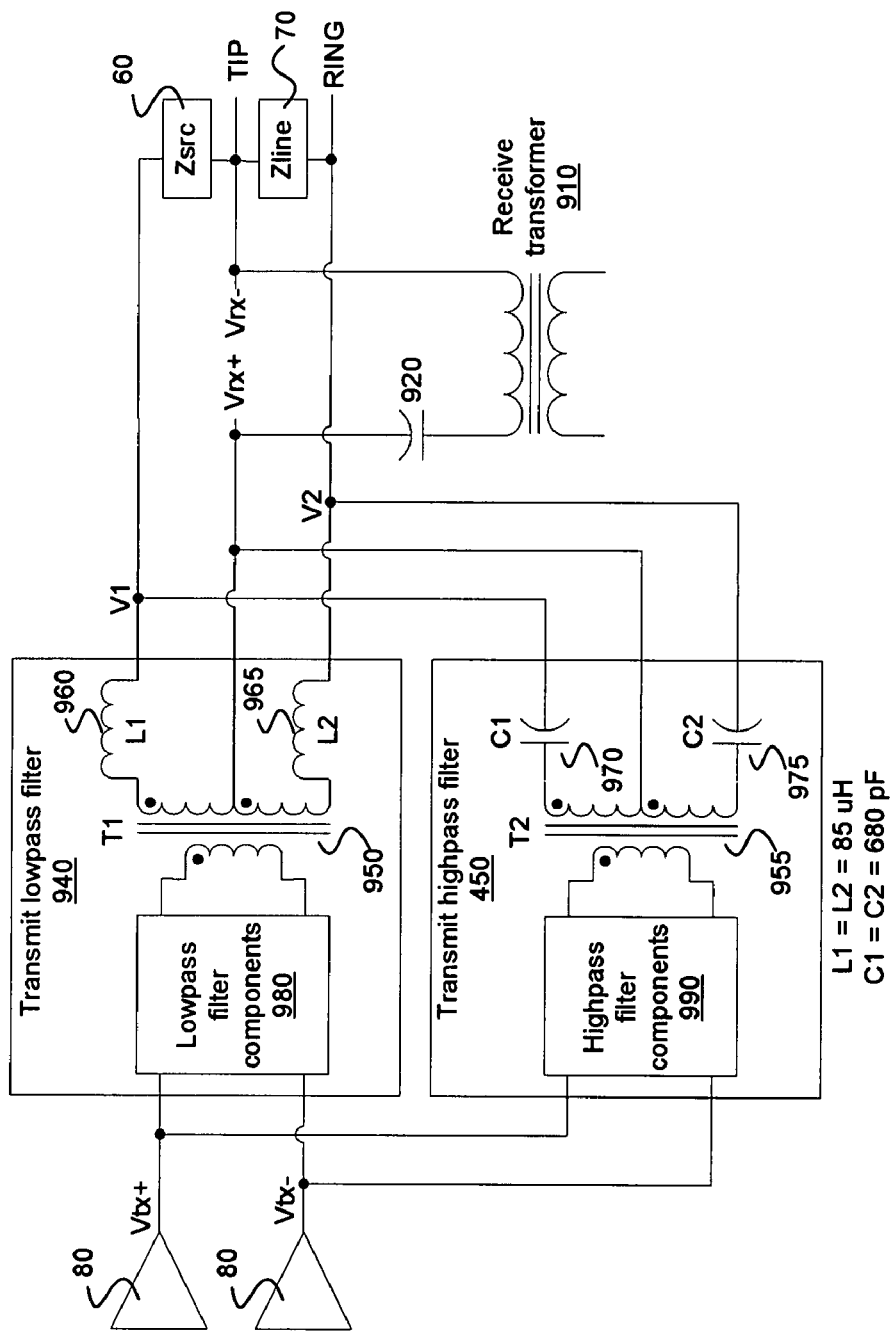
FIG. 10 illustrates a schematic diagram of another embodiment of a hybrid circuit configuration with lowpass and highpass filters.

FIG. 10 illustrates another embodiment of a hybrid circuit configuration with lowpass and highpass filters in which transmit transformer 950 is incorporated into lowpass filter 940, and transmit transformer 955 is incorporated into highpass filter 450 to make efficient use of components and to take advantage of the leakage and magnetizing inductances of the transformers. The values of inductive components 960 and 965 are the same and equal to approximately 85 uH, and the values of capacitive components 970 and 975 are the same and equal to approximately 680 pF. By superposition, hybrid cancellation of the transmit signal from the receive path operates independently and identically in both the first frequency band and the second frequency band.

The lowpass transmit filter incorporates inductance and capacitance values of the windings in the first transmit transformer. The highpass transmit filter incorporates inductance and capacitive values of the windings of the highpass transmit transformer.

Embodiments such as the one in FIG. 10 may provide several advantages for VDSL and multi-mode applications. First, the topology enables high-performance multi-mode devices. Two transmit transformers are used to couple the transmit signal to the line, and because each transformer is selected to provide the desired performance within its designated frequency band, performance may be improved relative to when a single transformer couples all transmit bands to a communication line. Furthermore, by splitting the transmit path into a low-frequency path and a higher-frequency path and applying transmit filtering separately to each, VDSL performance on long loops may mimic ADSL performance because the transmit path for the first frequency band is substantially the same whether the modem operates in ADSL mode or VDSL mode. Additionally, because the lowpass and highpass filter cutoff frequencies are several octaves apart, components at the outputs of the transmit filters may be selected such that the highpass filter presents high impedance in the first frequency band, and the lowpass filter presents high impedance in the second frequency band. Therefore, the filter outputs can be combined in a parallel configuration without significantly degrading the frequency response in either the lowpass or highpass band. The outputs are combined to allow the multiple tone modem to have a single input-output phone jack to connect to. The multiple tone modem may have the lowpass transmit filter and first transmit transformer configured to support the frequency band of ADSL and have the highpass transmit filter and second transmit transformer configured to support the frequency band of VDSL, and concurrently support both frequency bands.

Figure 11:
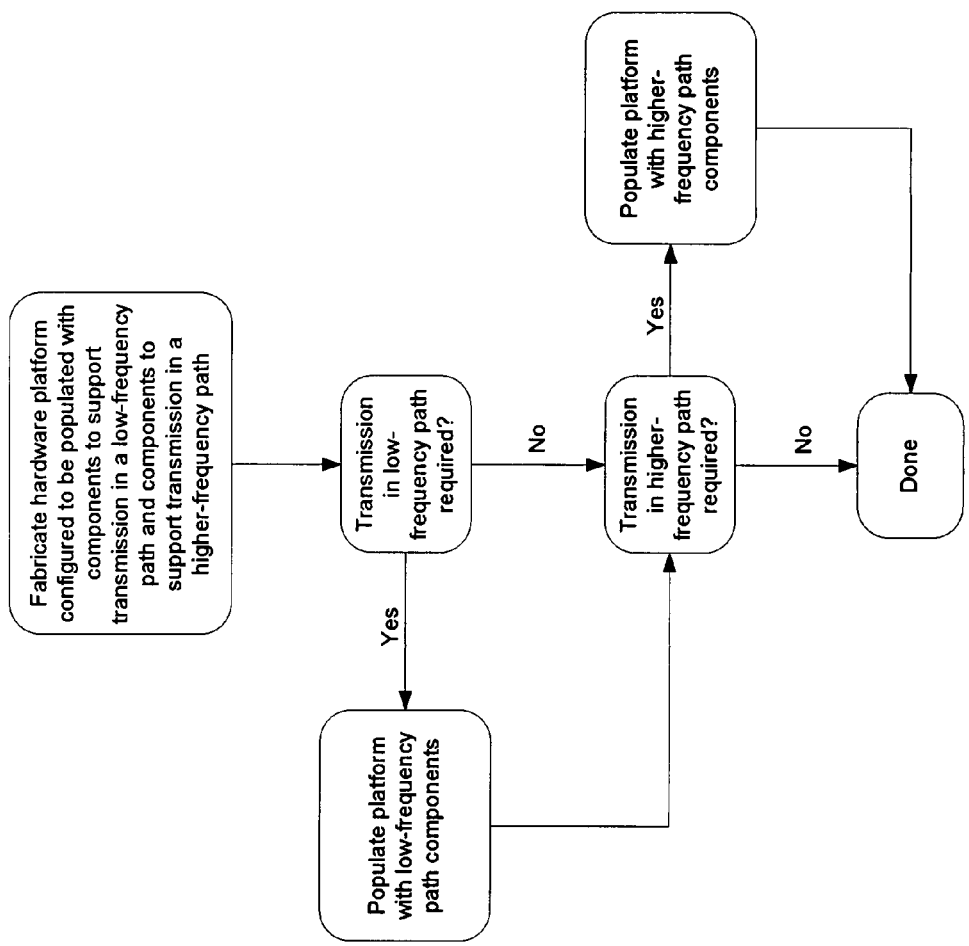
FIG. 11 illustrates a flowchart corresponding to a method of manufacture of an embodiment of a hybrid circuit configuration with lowpass and highpass filters.

An additional benefit of the embodiment of FIG. 10 arises in the case that a manufacturer wants to fabricate ADSL-only devices as well as multi-mode devices, as illustrated by FIG. 11, which shows a flowchart corresponding to a method of manufacture. Because the low-frequency path is the same whether the device is operating in ADSL or VDSL mode, a single hardware platform can be fabricated and selectively populated with components depending on whether the device is ADSL-only or multi-mode. For ADSL-only devices, the hardware platform would not need to be populated with the higher-frequency path components. Because the topology uses filter outputs that are combined in a parallel configuration, the absence of the higher-frequency path components has no significant effect on the operation of the modem in ADSL mode. Thus, the higher-frequency path components can simply be omitted to fabricate an ADSL-only device, which results in manufacturing efficiencies. Likewise, if a manufacturer wanted to fabricate VDSL devices that only operate on short loops, where transmission in the first frequency band may not appreciably improve achievable bit rates, the low-frequency path components could be omitted altogether during the manufacturing process.

Block 1102 in FIG. 11 represents fabricating a hardware platform configured to be populated with components to support transmission in a low-frequency path such as ADSL or US0 and components to support transmission in a higher-frequency path such as the remaining VDSL frequencies. Block 1104 represents making a determination of whether transmission in the low-frequency path is required. If yes, then the platform is populated with low-frequency path components in block 1108. Block 1106 represents making a determination of whether transmission in the higher-frequency path is required. If yes, then the platform is populated with higher-frequency path components in block 1110. Although FIG. 11 shows the decision of whether transmission in the low-frequency path is required as preceding the decision of whether transmission in the higher-frequency path is required, the order may be reversed.

Thus, the hardware platform may be selectively populated with only the low-frequency path components, with only the high-frequency path components, or with both the low-frequency and high-frequency path components being populated on the same hardware platform. Also, the low frequency components will not substantially affect performance of the ADSL transmission during subsequent operation of the DSL modem even though they are on the same hardware platform. Note, the same hardware platform is configured or manufactured to be capable of containing both the high and low frequency components regardless of the actual population of the low-frequency components for the ADSL frequency band and the high frequency components for the VDSL frequency band onto that platform. The multiple mode modem may be a low cost, high performance ADSL circuit design that also allows high performance VDSL performance by populating some additional components on the same platform. There will be cost savings associated with designing and maintaining just one base unit rather than two distinct units. Even if the two frequency bands are merely used for VDSL frequencies, the VDSL filter implementation is low cost and high performance in and of itself.

Although some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. A multiple tone modem, comprising:
 a line interface circuit having a hybrid circuit with both one or more transmit transformers and one or more receive transformers to interface the multiple tone modem to a communication line, wherein the hybrid circuit comprises:
  a lowpass transmit filter having lowpass functionality to confine a transmit signal through an output of the lowpass transmit filter to a first frequency band:
  a highpass transmit filter having highpass functionality to confine a transmit signal through an output of the highpass transmit filter to a second frequency band that is higher than the first frequency band, wherein the output of the lowpass transmit filter and the output of the highpass transmit filter are coupled on the communication line side of the hybrid circuit in a parallel configuration and an upper edge of the first frequency band confined to pass through the lowpass transmit filter and a lower edge of the second frequency band confined to pass through the highpass transmit filter are sufficiently separated to reduce interference effects between the two filters from the other frequency band;
 a first transmit transformer with device side windings coupled to a line driver and with communication line side windings coupled to the communication line;
 a second transmit transformer with device side windings coupled to the line driver and with communication line side windings coupled to the communication line;
 a first receive transformer for a receive signal with device side windings coupled to a receiver and with communication line side windings coupled to the communication line; and
 an impedance component coupled to the communication line side windings of the receive transformer and the communication line side windings of the first transmit transformer, wherein the impedance component substantially matches an impedance value of the line to cancel the transmit signal from the receive signal.

2. The multiple tone modem of claim 1, wherein the lowpass transmit filter incorporates inductance and capacitance values of the windings in the first transmit transformer and inductance and capacitive values of the windings of the highpass transmit transformer are incorporated into the highpass transmit filter.

3. The multiple tone modem of claim 1, wherein a frequency response range of the first transmit transformer is optimized and configured to pass the first frequency band, and a frequency response range of the second transmit transformer is optimized and configured to pass the second frequency band and the outputs of the highpass and lowpass transmit filters that are coupled in parallel on the communication line side of the hybrid circuit are electrically in series with a first input-output communication line plug for the multiple tone modem.

4. The multiple tone modem of claim 1, wherein the lowpass transmit filter couples to the device side windings of the first transmit transformer and also couples to the communication line side windings the first transmit transformer to form a telecommunications network voltage (TNV) isolation circuit and to shape the frequency range of the first frequency band.

5. The multiple tone modem of claim 1, wherein the highpass transmit filter couples to the device side windings of the second transmit transformer and to the communication line side windings of the second transmit transformer to form a telecommunications network voltage (TNV) isolation circuit and to shape the frequency range of the second frequency band.

6. The multiple tone modem of claim 5, wherein the highpass transmit filter is coupled to a transmit line driver output and is also coupled to the communication line side windings of the second transmit transformer.

7. The multiple tone modem of claim 1, wherein the lowpass transmit filter coupled to the device side windings of the first transmit transformer includes a value of uncoupled leakage inductance in the first transmit transformer in determining its frequency response.

8. The multiple tone modem of claim 1, wherein at least a portion of the lowpass transmit filter is coupled between a first transmit line driver output and the device side windings of a first transmit transformer and at least a portion of the highpass transmit filter is coupled between a second transmit line driver output and the device side winding of the highpass transmit transformer and the line driver is comprised of a first line driver and a second line driver.

9. The multiple tone modem of claim 1, wherein the multiple tone modem is a DSL modem with the lowpass transmit filter and first transmit transformer configured to support the frequency band of ADSL and with the highpass transmit filter and second transmit transformer configured to support two or more frequency bands of VDSL.

10. The multiple tone modem of claim 1, further comprising:
mode logic to detect and control whether the multiple tone modem operates as either an ADSL modem or as a VDSL modem, depending on the detected characteristics of a device on the other end of the communication line, wherein if the mode logic detects that the device on the other end of the communication line is operating as an ADSL modem, then the multiple tone modem also operates in ADSL mode, whereas if mode logic detects that the device on the other end of the communication line is operating as a VDSL modem, then the multiple tone modem operates in VDSL mode.

11. A multiple tone modem, comprising:
a line interface circuit having a hybrid circuit with both one or more transmit transformers and one or more receive transformers to interface the multiple tone modem to a communication line, wherein the hybrid circuit comprises:
a lowpass transmit filter having lowpass functionality to confine a transmit signal through an output of the lowpass transmit filter to a first frequency band; and
a highpass transmit filter having highpass functionality to confine a transmit signal through an output of the highpass transmit filter to a second frequency band that is higher than the first frequency band, wherein the output of the lowpass transmit filter and the output of the highpass transmit filter are coupled on the communication line side of the hybrid circuit in a parallel configuration and an upper edge of the first frequency band confined to pass through the lowpass transmit filter and a lower edge of the second frequency band confined to pass through the highpass transmit filter are sufficiently separated to reduce interference effects between the two filters from the other frequency band, wherein cutoff frequencies and components of the lowpass and highpass transmit filters are selected so that the connection in parallel of the lowpass and highpass transmit filter outputs substantially does not load a frequency response of the lowpass transmit filter to leave the frequency response of the lowpass transmit filter substantially unchanged.

12. The multiple tone modem of claim 11, wherein the lowpass transmit filter has a cutoff frequency in the range from approximately 138 kHz to approximately 512 kHz to form the first frequency band, and the highpass transmit filter has a cutoff frequency of approximately 3.75 MHz to form the second frequency band.

13. The multiple tone modem of claim 11, wherein the multiple tone modem is a VDSL transceiver and the lowpass transmit filter passes the VDSL upstream band known as US0 in the first frequency band and the highpass transmit filter passes other VDSL upstream bands in the second frequency band.

14. A communication system, comprising:
a first modem coupled to a first end of a plain old telephone system communication line and configured to receive signals in a first and second frequency bands, wherein the plain old telephone system communication line includes a tip line and a ring line having the first end and a second end; and
a second DSL modem, comprising:
a first transmit transformer with a first end coupled to a line driver and a second end coupled to the second end of the communication line;
a first transmit filter having lowpass functionality to confine a transmit signal to a first frequency band;
a second transmit transformer with a first end coupled to a line driver and a second end coupled to the second end of the communication line;
a second transmit filter having highpass functionality to confine a transmit signal to a second frequency band that is higher than the first frequency band, wherein the output of the lowpass filter and the output of the highpass filter are coupled using a parallel configuration and are electrically in series with a first input-output plug to the second end of the communication line;
a first receive transformer for a receive signal with device side windings coupled to a receiver and with communication line side windings coupled to the communication line; and an impedance component coupled to the communication line side windings of the receive transformer and the communication line side windings of the first transmit transformer, wherein the impedance component substantially matches an impedance value of the line to cancel the transmit signal from the receive signal.

15. The communication system of claim 14, wherein the first transmit filter of the second DSL modem incorporates inductance and capacitance values of the windings in the first transmit transformer and inductance and capacitive values of the windings of the second transmit transformer are incorporated into the second transmit filter.

16. The communication system of claim 14, wherein cutoff frequencies and components of the first and second transmit filters are selected so that the connection in parallel of the first and second transmit filter outputs substantially does not load a frequency response of the first transmit filter to leave the frequency response of the second transmit filter approximately unchanged.

* * * * *